US012427610B2

(12) United States Patent  
Codini et al.

(10) Patent No.: US 12,427,610 B2  
(45) Date of Patent: Sep. 30, 2025

(54) TABLE GROUP FOR A MACHINE TOOL

(71) Applicant: INNSE-BERARDI S.P.A. SOCIETA' UNIPERSONALE, Milan (IT)

(72) Inventors: Roberto Codini, Milan (IT); Giovanni Zanatta, Milan (IT)

(73) Assignee: INNSE-BERARDI S.P.A. SOCIETA' UNIPERSONALE, Brescia (IT)

( * ) Notice: Subject to any disclaimer, the term of this patent is extended or adjusted under 35 U.S.C. 154(b) by 544 days.

(21) Appl. No.: 17/925,100

(22) PCT Filed: Mar. 8, 2021

(86) PCT No.: PCT/IB2021/051905  
§ 371 (c)(1),  
(2) Date: Nov. 14, 2022

(87) PCT Pub. No.: WO2021/240250  
PCT Pub. Date: Dec. 2, 2021

(65) Prior Publication Data  
US 2023/0182246 A1  Jun. 15, 2023

(30) Foreign Application Priority Data  
May 25, 2020 (IT) ..................... 102020000012226

(51) Int. Cl.  
*B23Q 1/38* (2006.01)

(52) U.S. Cl.  
CPC ........ *B23Q 1/385* (2013.01); *B23Q 2220/004* (2013.01)

(58) Field of Classification Search  
CPC .......... B23Q 1/385; B23Q 1/38; B23Q 1/522; B23Q 2220/004; F16C 2322/39  
See application file for complete search history.

(56) References Cited

U.S. PATENT DOCUMENTS 4,080,849 A * 3/1978 Benjamin ............ B23Q 16/102  
74/820  
5,072,651 A * 12/1991 Kagita ..................... F16D 55/10  
92/75

(Continued)

FOREIGN PATENT DOCUMENTS

| CN | 103286660 | * | 9/2013 |
| CN | 103286660 B | | 12/2015 |
| EP | 0214729 A1 | | 3/1987 |

OTHER PUBLICATIONS

International Search Report for International Patent Application No. PCT/IB2021/051905, mailed May 31, 2021.

(Continued)

*Primary Examiner* — Seahee Hong  
(74) *Attorney, Agent, or Firm* — CANTOR COLBURN LLP

(57) ABSTRACT

A table group for a machine tool is provided. The table group has a support assembly, a table, a ring gear provided with a lower face and an upper face, integral with the table, a plurality of main hydrostatic skids, a detection device for detecting a lifting action generated by the main hydrostatic skids, a plurality of dogs and an electronic management device operatively connected to the main hydrostatic skids, the dogs and the detection device, configured to control the dogs to generate a contrasting action. The lifting action is equal to a predetermined constant nominal load greater than the weight of a semi-finished product and either smaller than or equal to a maximum load which can be borne by the main hydrostatic skids.

10 Claims, 6 Drawing Sheets

(56) References Cited

U.S. PATENT DOCUMENTS

| | | | |
|---|---|---|---|
| 5,440,952 A * | 8/1995 | Nakashima | B23Q 16/102 198/375 |
| 5,651,301 A * | 7/1997 | Thoma | F04B 1/1071 417/273 |
| 2017/0120404 A1 * | 5/2017 | Nakano | B23Q 16/001 |

OTHER PUBLICATIONS

Written Opinion for International Patent Application No. PCT/IB2021/051905, mailed May 31, 2021.

* cited by examiner

TABLE GROUP FOR A MACHINE TOOL

CROSS-REFERENCE TO RELATED APPLICATIONS

This application is a National Phase Application of PCT International Application PCT/IB2021/051905, having an International Filing Date of Mar. 8, 2021 which claims priority to Italian Application No. 102020000012226 filed May 25, 2020, each of which is hereby incorporated by reference in its entirety.

FIELD OF THE INVENTION

The present invention relates to the field of machine tools, and in particular to the field of large machine tools, such as a vertical lathe. In particular, it is an object of the present invention to provide a table group of a machine tool, intended to support the semi-finished product to be machined.

BACKGROUND OF THE INVENTION

Such machine tools are used for performing machining operations on large semi-finished products, such as shafts for marine engines, tanks for the oil industry or parts of power plants.

Due to the criticality of such components, extremely tight machining tolerances are generally required. Therefore, machine tool manufacturers are constantly researching and developing solutions that can guarantee these tolerances.

SUMMARY OF THE INVENTION

It is the purpose of the present invention to provide a table group for a large machine tool that meets the needs of the sector.

Such an object is achieved by a table group as described and claimed herein. Preferred advantageous embodiments of the present invention and variants of those preferred embodiments are also described.

BRIEF DESCRIPTION OF THE FIGURES

The features and advantages of the table group according to the present invention will be apparent from the following description, given by way of non-limiting example, according to the accompanying figures, in which.

DETAILED DESCRIPTION

Figure 1:
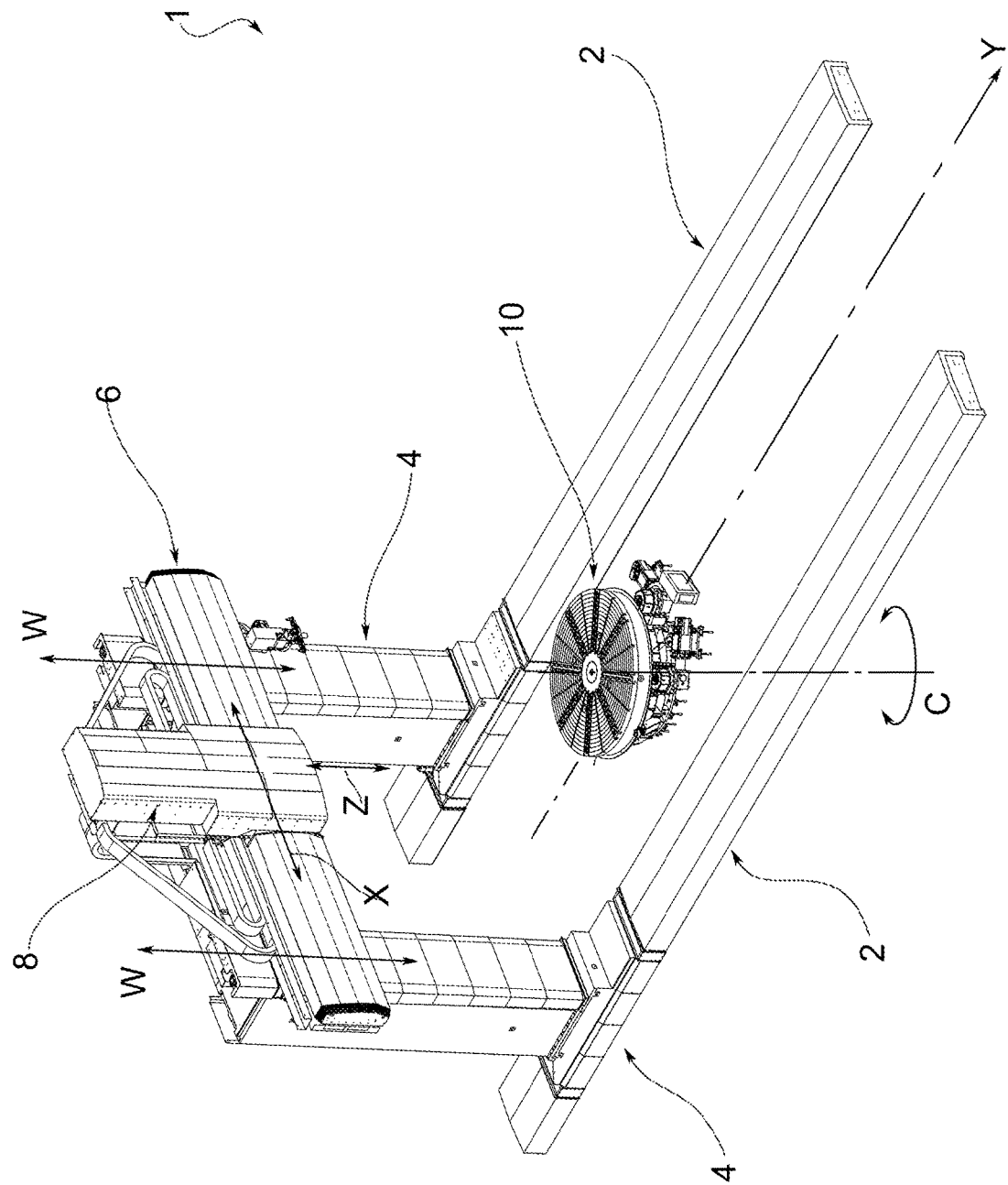
FIG. 1 shows a machine tool according to an embodiment of the present invention.

With reference to the accompanying figures, a large machine tool is indicated by reference numeral 1 as a whole.

For example, said machine tool is a vertical lathe.

For simplicity of exposition, reference will hereinafter be made to a vertical lathe, but the invention is likewise referred to a milling machine or a generic machining center.

In the illustrated embodiment (FIG. 1), the machine tool 1 comprises a pair of benches 2, each extending prevalently along a longitudinal gantry translation axis Y, parallel to each other, resting on a reference plane, e.g., the ground plane. The machine tool 1 further comprises a pair of uprights 4, each extending prevalently vertically, parallel to each other and adapted to be moved upon command along the gantry translation axis Y.

The machine tool 1 further comprises a crossbar 6, having extending prevalently transversally, translatable supported by the two uprights 4; in particular, the crossbar 6 can translate upon command along a vertical crossbar translation axis W, perpendicular to the reference plane.

The machine tool 1 further comprises a head 8 translatably supported by the crossbar 6; in particular, the head 8 can translate upon command along a transverse head translation axis X, orthogonal to the crossbar translation axis W or parallel to the reference plane.

The machine tool 1 further comprises a spindle (not shown), carrying a tool for mechanical machining, translatably supported by the head 8; in particular, the spindle can translate upon command along a vertical spindle translation axis Z, perpendicular to the reference plane.

For supporting the semi-finished product to be subjected to the turning (or milling) process and rotating it about a rotation axis C, the machine tool 1 further comprises a table group 10, generally arranged between the benches 2.

Figure 2:
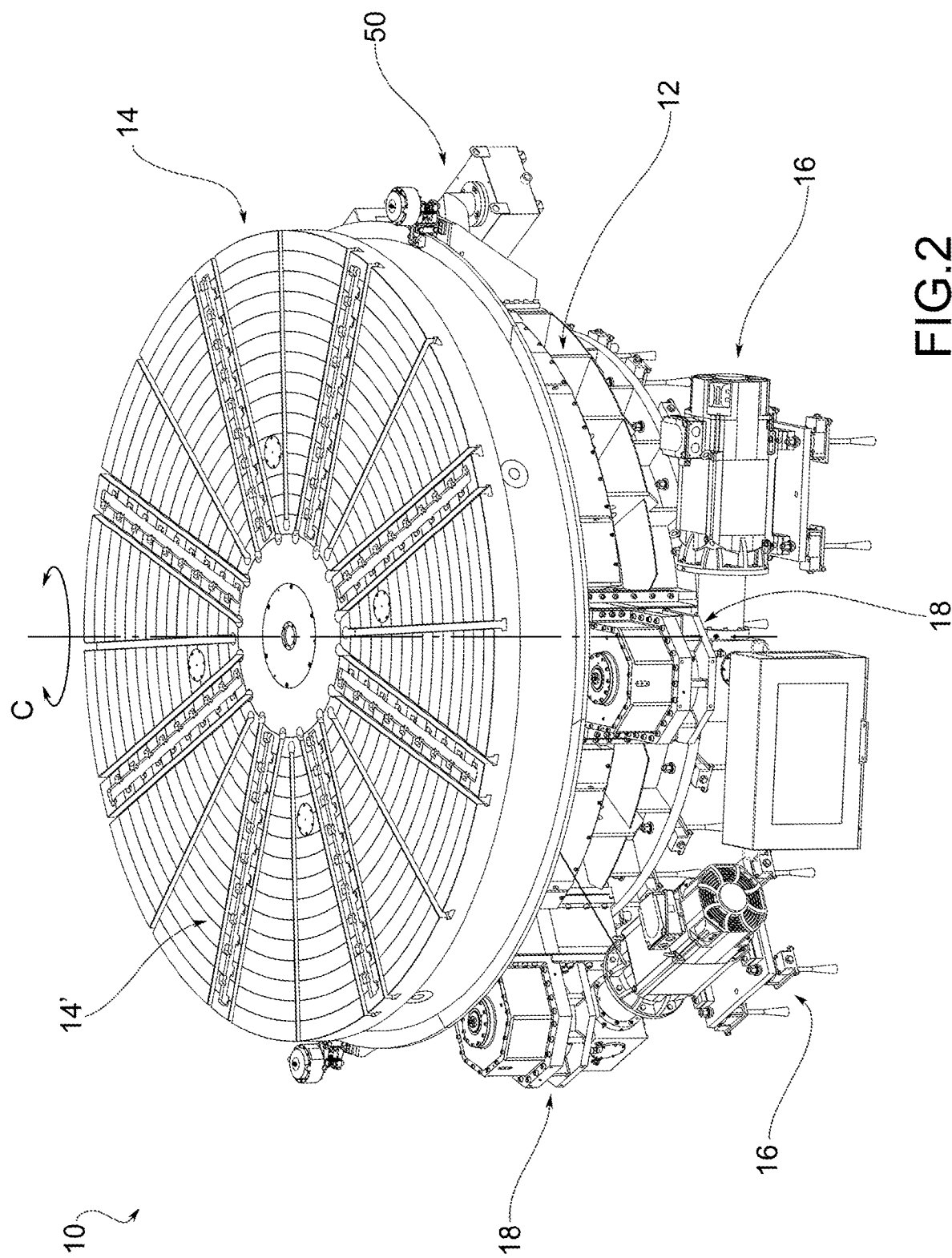
FIG. 2 shows a table group of the machine tool in FIG. 1 according to an embodiment of the invention.
Figure 3:
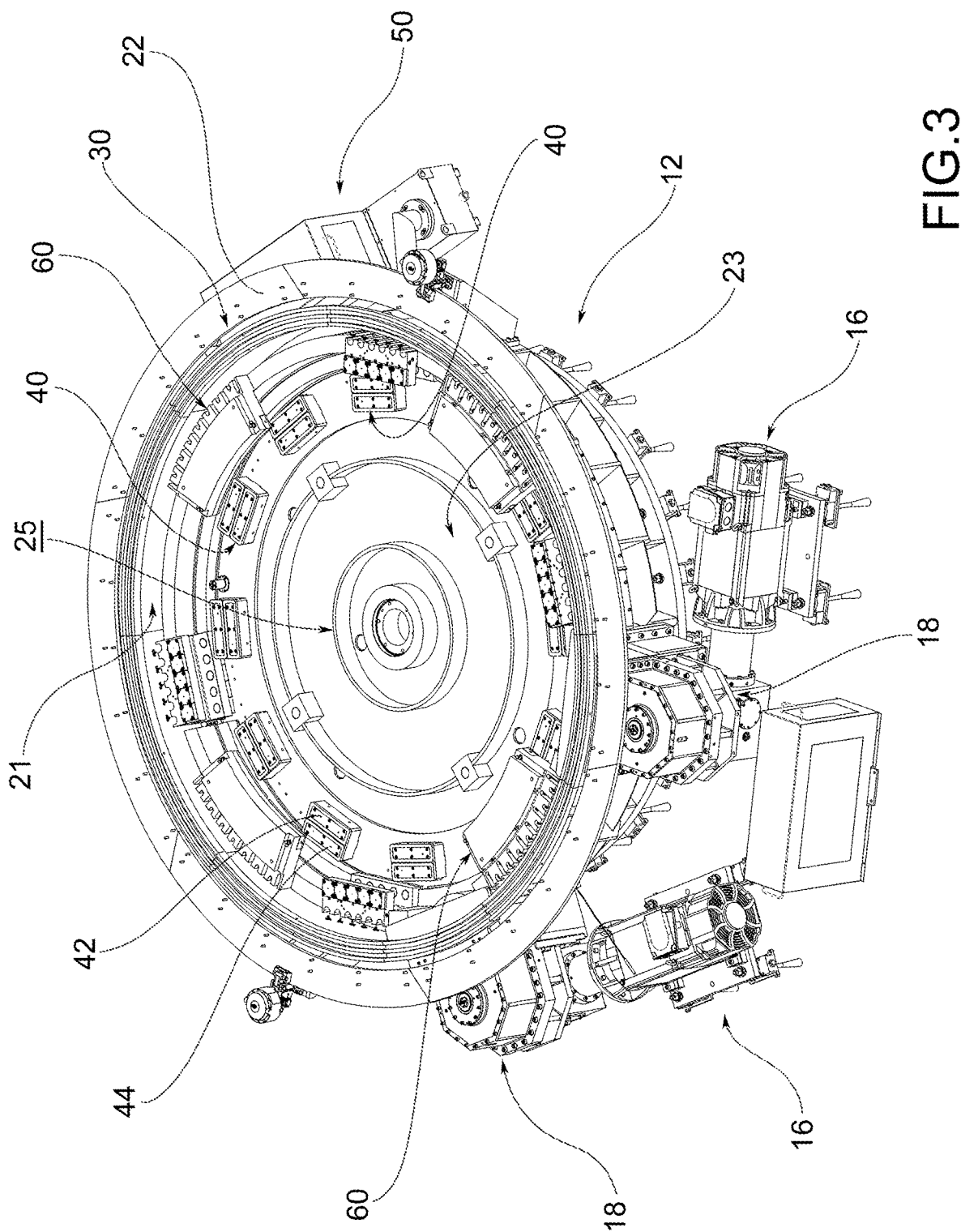
FIG. 3 shows the support assembly of the table group in FIG. 2, according to an embodiment of the invention.

In the illustrated embodiment (FIGS. 2 and 3), the table group 10 comprised a fixed, tub-shaped support assembly 12 and a typically circular table 14, rotatable about the rotation axis C, supported by the support assembly 12.

The table group 10 further comprises at least one electric motor 16 rotationally actuating the table 14, operatively connected to said table 14 through a kinematic chain.

For example, each motor 16 is located on the reference plane, with a horizontal axis, adjacent to the rotary table 14, and the kinematic chain comprises a bevel gear redirecting device 18 to achieve rotation with a vertical axis.

Figure 4:
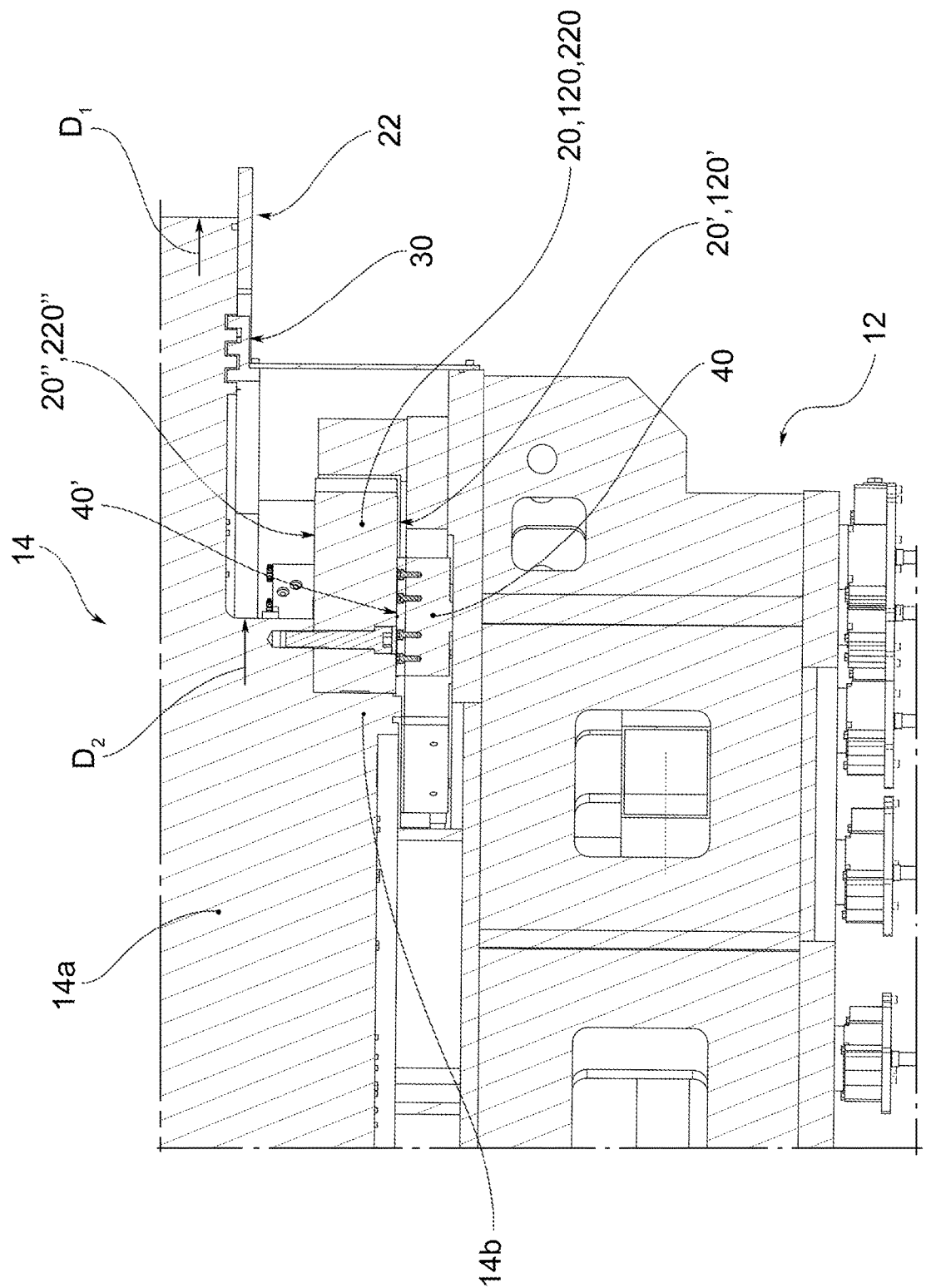
FIG. 4 is a cross-section view of the table group, which shows a main skid of the table group.
Figure 5:
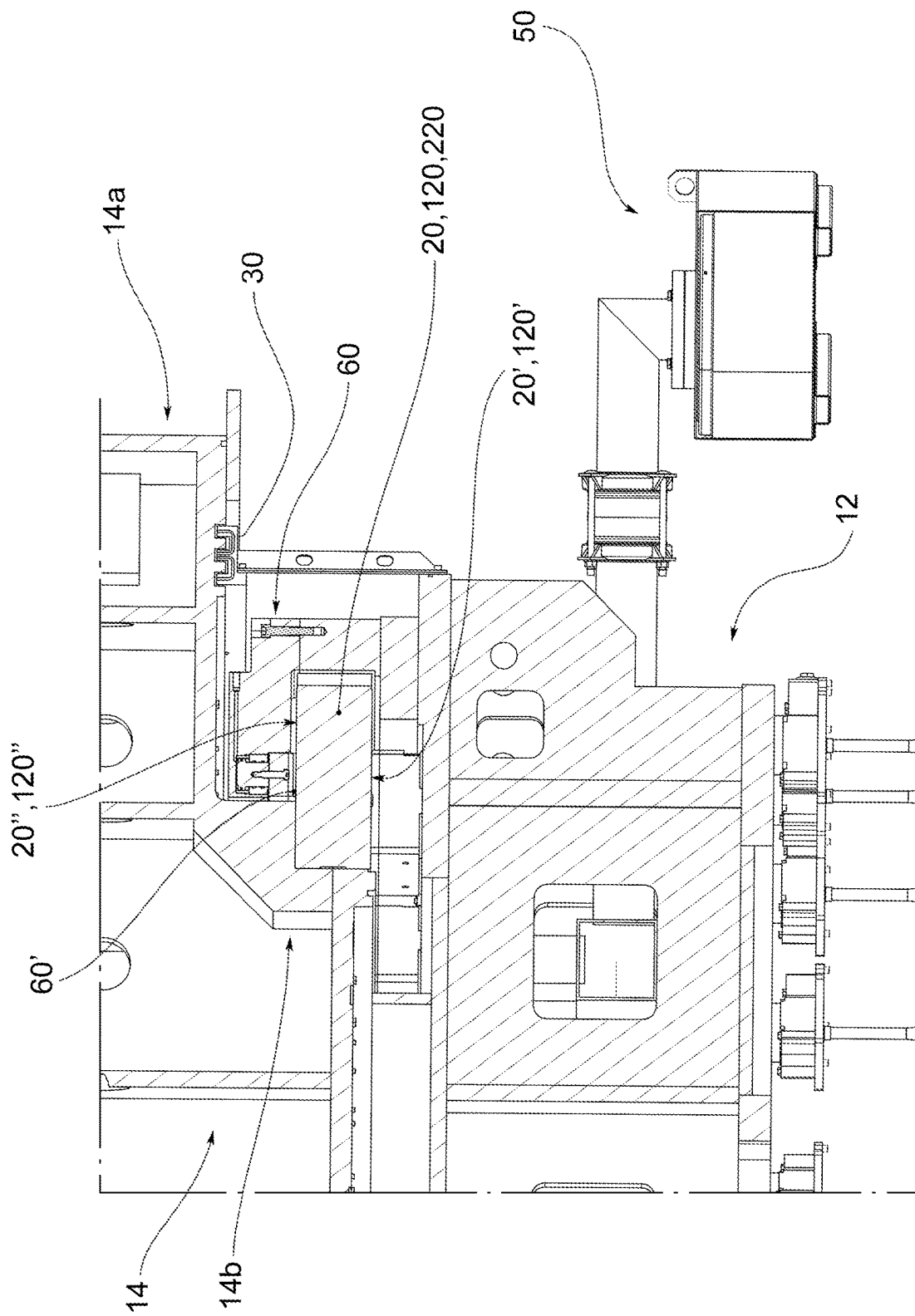
FIG. 5 is a cross-section view of the table group, which shows a dog of the table group.
Figure 6:
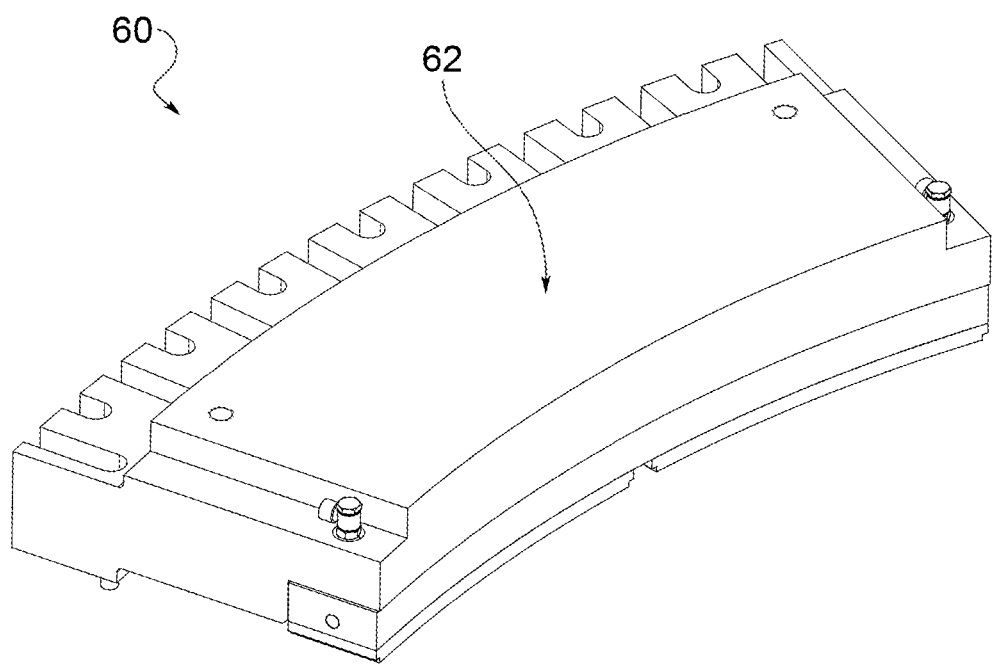
FIG. 6 shows a dog of the table group, according to an embodiment of the invention.
Figure 7:
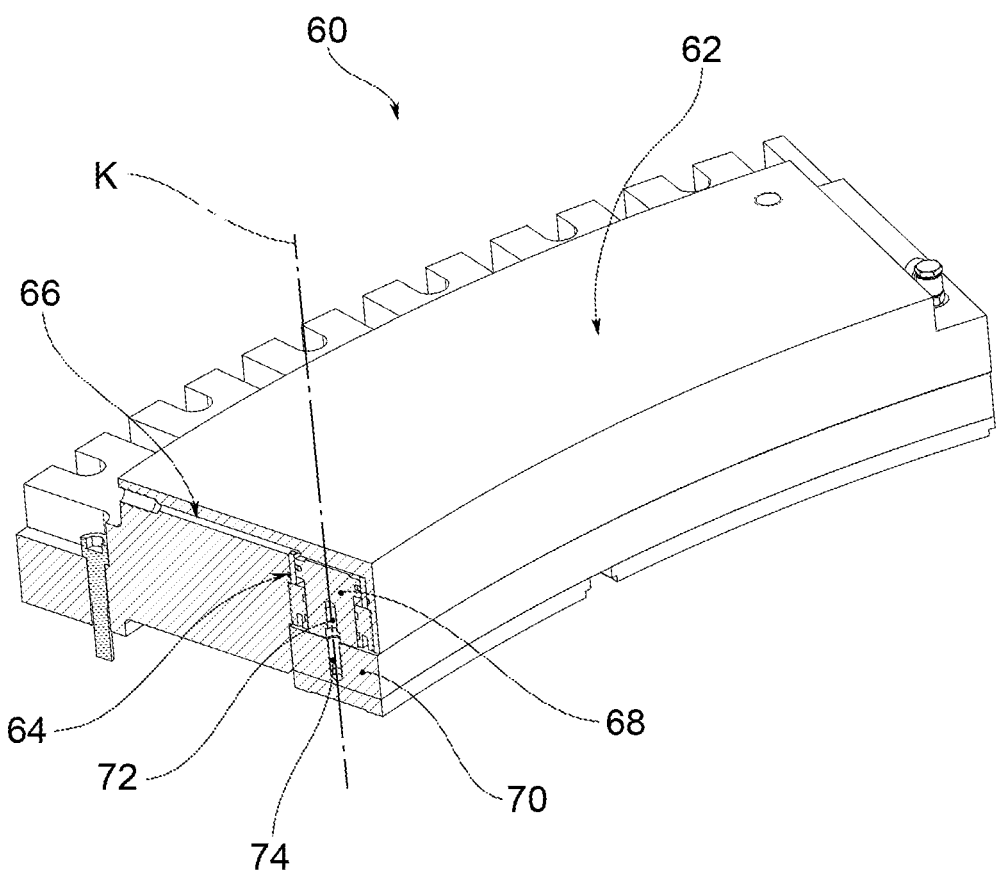
FIG. 7 is a cross-section view of the dog in FIG. 6, which shows a secondary skid and a piston.

The table 14 is further provided with a toothed ring gear 20 (FIG. 4), operatively connected to the motor 16, e.g., through said redirecting device 18, to be driven in rotation.

For example, the table 14 comprises an upper portion 14a, bearing the circular upper face 14' for supporting the semi-finished product, and a lower portion 14b, projecting axially downwardly from the upper portion 14a. The upper portion 14a has a first maximum diameter D1, while the lower portion 14b has a second maximum diameter D2; the first maximum diameter D1 is greater than the second maximum diameter D2 so that the table has a stepped configuration.

Preferably, the ring gear 20 is fixed coaxially to the lower portion 14b of the table 14.

According to an embodiment, the support assembly 12 comprises an annular wall 21, a bottom 23, which inferiorly closes the annular wall 21, and a band 22 in the form of a circular ring gear, coaxial to the rotation axis C, placed at the upper end of the annular wall 21, to circumferentially delimit the opening towards an inner compartment 25 of the support assembly. A peripheral region of the upper portion 14a of the table 14 is superimposed on the band 22.

A labyrinth device 30 is operative between the band 22 and the peripheral region of the upper portion 14a to achieve a seal between the rotating table 14 and the fixed support assembly 12.

The table group 10 further comprises a plurality of hydrostatic skids 40 for supporting the table 14 by means of pressurized fluid, capable of providing a lifting action F1, directed from the bottom upwards, which tends to lift the table 14 relative to the support assembly 12, thereby detaching it from contact with the latter and allowing the rotation with low friction.

Preferably, the hydrostatic skids 40 are located below the ring gear 20 to cooperate with a lower face 20' of said ring gear 20 to form a pressure chamber 40' or meatus.

According to a preferred embodiment, each hydrostatic skid 40 has an inner pocket 42, for forming an inner meatus, and an outer pocket 44, located radially external to the inner pocket 42, for forming an outer meatus.

Preferably, the table group 10 further comprises a first hydraulic pump and a first circuit, connected to the first hydraulic pump, for supplying pressurized fluid to the inner pockets 42 of all the hydrostatic skids 40, and a second hydraulic pump and a second circuit, connected to the second hydraulic pump, for supplying pressurized fluid to the outer pockets 44 of all the hydrostatic skids 40.

The table group 10 further comprises a detection device adapted to detect the lifting action F1 generated by the main skids 40; e.g., the detection device comprises at least one pressure sensor (not shown) for detecting the fluid pressure operating in the main pressure chamber 40'; preferably, the table group comprises a first pressure sensor operating along the first circuit and a second pressure sensor operating along the second circuit.

In a preferred embodiment, in which a plurality of pressure sensors, which detect the pressure in only a few main skids, is provided, the detected pressure values are interpolated to estimate the value of the pressure also on the other skids and thus calculate the lifting action F1.

The fluid escaping from the main chambers 40' of the main skids 40 is collected on the bottom 23 of the support assembly 12, preferably by gravity, and returned by a pumping device 50 to the hydrodynamic unit, which pressurizes the hydrostatic skid supply circuit.

For example, the table group 10 comprises twelve main skids, placed angularly equispaced.

Furthermore, according to the invention, the table group 10 comprises a plurality of dogs 60, adapted to operate by means of pressurized fluid on the table 14, providing a contrasting action F2, from the top downwards, contrary to the lifting action F1.

Preferably, said dogs 60 are placed above said ring gear 20 to cooperate with an upper face 20" of said ring gear 20 to make a secondary pressure chamber 60' or meatus.

According to further embodiments of the present invention, the main skids 40 operate on a lower face 120' of a main biasing portion 120 integral with the table 14 and the dogs 60, and secondary skids 70 thereof, on an upper face 220" of a secondary biasing portion 220 integral with the table 14.

According to a preferred embodiment, each dog 60 comprises a body 62 intended to be fixed to the support assembly 12, within which at least one piston chamber 64 is obtained which can be fed with pressurized fluid through a control circuit 66.

The dog 60 further comprises a sealed sliding piston 68 in the piston chamber 64, preferably dual-acting, along an actuation direction K.

The dog 60 further comprises a hydrostatic secondary skid 70, which can be biased by the piston 68 to be pushed towards the upper surface 20" of the ring gear 20, with which it forms the secondary pressure chamber 60'.

The secondary skid 70 is preferably movable along the actuation direction K relative to the piston 68. In other words, in a condition in which the piston 68 is fixed, the skid 70 is movable along the drive direction K to vary the height of the corresponding secondary pressure chamber 60'.

For this purpose, the secondary skid 70 is engaged with the piston 68 by at least one grub screw (not shown) accommodated with play in a piston housing 72 and a skid housing 74, aligned along said direction of actuation K.

The fluid escaping from the secondary pressure chambers 60' of the secondary skids 70 is collected, preferably by gravity, and returned by the pumping device 50 to the hydrodynamic unit.

According to an embodiment, the piston can be actuated by generic piston actuating means, e.g., electrical.

We will assume that the main skids 40 of the table group 10 can support a maximum load Pmax, that the table 14 has a weight Ptav, and that the semi-finished product to be machined has a weight Psem.

In a step of setting of the table group 10, the table 14 is resting on the support assembly 12 and the main skids 40 are actuated until the table 14 is raised. According to the pressure value detected by the pressure sensors, it is thus possible to determine the weight of the table Ptav, which constitutes the tare weight of the system.

The pressure of the fluid operating on the main skids 40 increases when the semi-finished product is placed on table 14; the weight Psem of the semi-finished product can be determined based on this value, measured by the pressure sensors.

The total load on the table 14 is thus Ptot=Ptav+Psem.

Having defined a nominal load P* (with Ptot<P*≤Pmax, i.e. greater than the total load, but either lower than or equal to the maximum load that can be borne by the main skids), preferably equal to the maximum load (P*=Pmax), the dogs 60 are supplied with pressurized fluid which operates in thrust on the respective pistons 68 to obtain an additional load equal to the contrasting action F2=P*−Ptot, i.e. equal to the difference between the nominal load and the total load weighing on the table.

Consequently, the main skids 40 operate in a condition so that they feel a load equal to the nominal load P* and are supplied by pressurized fluid to generate a lifting action F1=P*, i.e., equal to the nominal load.

With the same load acting on the skids, the height of the main pressure chamber 40' is constant. This means that the upper face 14' of the table 14 is at a constant height relative to the tool carried by the machine tool head 6, even when the weight of the semi-finished product varies.

The variation in the weight of the semi-finished product occurs because different semi-finished products having different weights are machined at different times, or because the weight changes during the machining of a predetermined semi-finished product due to chip separation.

In other words, the table group 10 comprises an electronic management means device operatively connected to the main skids 40, the dogs 60 and the detection means device, configured to control the dogs 60 to generate a contrasting action F2 such that the lifting action F1 is equal to a predetermined constant nominal load P*.

Furthermore, the load being equal on the main skids, the stiffness of the main skids is constant. Indeed, it is well known that the stiffness of hydrostatic skids is not linear, but varies as a function of the load on the skids themselves. On the other hand, the invention makes it possible to keep the stiffness constant and, given the proportionality between the weight load and the stiffness, to keep it practically equal to the maximum stiffness.

All this makes it possible to reduce the machining tolerances ensured by the table group, according to the needs of the sector, as mentioned above.

It is apparent that a person skilled in the art may made changes to the machine tool described above, all of which are contained within the scope of protection as defined in the following claims in order to satisfy contingent needs.

The invention claimed is:

1. A table group for a machine tool configured to rest on a horizontal reference plane, the table group comprising:
   a support assembly comprising a support comprising an annular wall delimiting an inner compartment;
   a table supported by the support assembly, rotationally about a vertical rotation axis;
   a main biasing portion provided with a lower face and a secondary biasing portion provided with an upper face, the main and secondary biasing portions being jointed to the table;
   a plurality of main hydrostatic skids, fixed to the support assembly, adapted to support the table by means of a pressurized fluid, generating a lifting action, each main hydrostatic skid of the plurality of main hydrostatic skids being configured to form a main pressure chamber with the lower face of the main biasing portion, in which a meatus supporting the table is formed;
   a detection device adapted to detect the lifting action generated by the main hydrostatic skids;
   a plurality of dogs fixed to the support assembly, adapted to push the table towards the main hydrostatic skids by means of the pressurized fluid, generating a contrasting action, wherein each dog of the plurality of dogs comprises a secondary hydrostatic skid, each secondary hydrostatic skid being configured to create a secondary pressure chamber with the upper face of the secondary biasing portion, in which a meatus pushing the table towards the main hydrostatic skids is formed; and
   an electronic management device operatively connected to the main hydrostatic skids, the dogs and the detection device, configured to control the dogs to generate the contrasting action such that the lifting action is equal to a predetermined constant nominal load (P*), which is greater than a weight of a semi-finished product and either smaller than or equal to a maximum load (Pmax) which can be borne by the main hydrostatic skids.

2. The table group of claim 1, further comprising:
   at least one electric motor configured to rotate the table; and
   a ring gear, which is jointed to the table and operatively connected to the at least one electric motor;
   wherein said ring gear forms the main biasing portion and a lower face of said ring gear forms the lower face of the main biasing portion.

3. The table group of claim 1, further comprising:
   at least one electric motor configured to rotate the table; and
   a ring gear, which is jointed to the table and operatively connected to the at least one electric motor;
   wherein said ring gear forms the secondary biasing portion and an upper face of said ring gear forms the lower face of the main biasing portion.

4. The table group of claim 1, wherein each dog further comprises a body, within which at least one piston chamber is formed, and a piston sliding in the at least one piston chamber to bias a corresponding secondary hydrostatic skid towards the upper face of the secondary biasing portion.

5. The table group of claim 4, wherein the secondary hydrostatic skid floats along an actuation direction relative to the piston.

6. The table group of claim 5, wherein the secondary hydrostatic skid is engaged with the piston) by at least one grub screw accommodated with clearance in a piston seat and a skid seat, aligned along the actuation direction.

7. The table group of claim 1, wherein the detection device comprises at least one pressure sensor configured to detect pressure of the pressurized fluid operating on the main hydrostatic skids.

8. A machine tool comprising the table group according to claim 1.

9. The machine tool of claim 8, wherein the machine tool is one of a vertical axis lathe, a milling machine, or a machining center.

10. A method for managing the machine tool of the table group of claim 1, the method comprising:
    supporting a predetermined semi-finished product on the table of the table group of the machine tool by the main hydrostatic skids fed with a fluid having a predetermined pressure to generate the lifting action on the table which generates the meatus;
    detecting the lifting action;
    defining a nominal load (P*) that is greater than the lifting action and either smaller than or equal to the maximum load (Pmax) which can be borne by the main hydrostatic skids;
    defining the contrasting action equal to a difference between the nominal load (P*) and the maximum load (Pmax): (F2=Pmax−P*); and
    actuating the plurality of dogs of the table group to weigh on the table with the contrasting action that is contrary to the lifting action.

* * * * *